Patented Oct. 27, 1936

2,058,986

UNITED STATES PATENT OFFICE 2,058,986

CEMENTITIOUS MATERIAL

Dean S. Hubbell, Pittsburgh, Pa., assignor to H. H. Robertson Company, Pittsburgh, Pa., a corporation of Pennsylvania No Drawing. Application February 13, 1936, Serial No. 63,735

4 Claims. (Cl. 106—29)

This invention relates to a cement and more particularly to an oxychloride cement.

The object of the invention is to provide a novel and improved oxychloride cement which may be economically manufactured, which exhibits improved water resistance, as compared with prior forms of oxychloride cements now on the market, and which because of its increased water resistance finds use for a large number of industrial and commercial purposes.

With this general object in view, and such others as may hereinafter appear, the invention consists in the oxychloride cement hereinafter described and particularly defined in the claims at the end of this specification.

It has heretofore been proposed to produce a calcined dolomite in which substantially all of the magnesium carbonate thereof is converted during the calcination to magnesium oxide, and also in which substantially none of the calcium carbonate is converted to calcium oxide. Reference is made to the McCaughey Patent No. 1,634,505, as disclosing the details of a process for calcining dolomite to produce this partially calcined product containing magnesium oxide and calcium carbonate. Attempts have heretofore been made to utilize this partially calcined dolomite as a source of plastic magnesia in the production of a magnesium oxychloride cement but difficulties have been experienced because of the fact that during the practical operation of calcining the dolomite, substantial amounts of calcium oxide have been formed from the calcination of a minor part of the calcium carbonate of the original dolomite and the presence of this calcium oxide in the partially calcined dolomite renders the use of such product unsuitable for the production of magnesium oxychloride cements. Experience has shown that the presence of substantial amounts of calcium oxide or calcium hydroxide have heretofore rendered plastic magnesia unsuitable for the production of satisfactory magnesium oxychloride cements because of the fact that the cement soon underwent dimensional changes and exhibited in general unsatisfactory stability when subjected to water or to high humidities.

I have discovered that a partially calcined dolomite containing substantial amounts of calcium oxide may be successfully utilized in the production of an improved magnesium oxychloride cement by the incorporation of finely divided cuprous oxide into the mass. In producing my improved oxychloride cement the partially calcined dolomite may be obtained from any suitable source, and it may be produced in accordance with the process set forth in the McCaughey patent above referred to, or in other suitable manner, and I incorporate finely divided cuprous oxide into the finely divided partially calcined dolomite in varying amounts, depending upon the use for which the oxychloride cement is ultimately intended, and in practice I have experienced satisfactory results using an amount of cuprous oxide varying from 3 to 10%, although it is understood that these proportions are indicative only of the average oxychloride cement and for special purposes the proportions may be varied, as may be readily determined by experiment. The proportions of magnesium chloride usually employed in producing magnesium oxychloride cement are then added to the mass and upon stirring a magnesium oxychloride cement is produced.

After the magnesium oxychloride cement has hardened and during the hardening process the cement takes on a characteristic blue-green color which I regard as due to the reaction between the cuprous oxide and the excess magnesium chloride in the presence of air, producing probably a basic copper chloride, and as a result the improved magnesium oxychloride cement has been found to experience none of the undesirable characteristics which have characterized prior magnesium oxychloride cements made from this partially calcined dolomite as a source of magnesia. I attribute the desirable characteristics and properties of my improved cement to the fact that the cuprous oxide undoubtedly removes the excessive magnesium chloride remaining in the cement after the formation of the magnesium oxychloride and reduces to a minimum the amount of the reaction between magnesium chloride and the lime or calcium oxide present in the partially calcined dolomite and as a result the presence of lime has no tendency to disrupt the cement and consequently the cement may be used with all of the advantages of and for all of the purposes of ordinary magnesium oxychloride cements. In addition the presence of the cuprous oxide in the magnesium oxychloride cement results as above stated in the production of the insoluble reaction product, probably basic copper chloride, which has been found to increase the water resistance of the cement and to increase its strength. As a result of the presence of the cuprous oxide in the improved cement the solubility of the cement is diminished and the amount of magnesium chloride which would otherwise be set free by the progressive solution of the cement when subjected to water, or when wet with water, is greatly diminished and avoids the possibility of reaction with the lime and the accompanying disruption and disintegration of the cement.

Having thus described the invention, what is claimed is:—

1. A new article of manufacture, comprising the cement resulting from the treatment of a partially calcined dolomite containing a small amount of lime and finely divided cuprous oxide, with a solution of magnesium chloride.

2. A new article of manufacture, an improved magnesium oxychloride cement comprising magnesium oxychloride containing lime and an insoluble blue-green component resulting from the reaction of the magnesium chloride with finely divided cuprous oxide in the presence of air.

3. A new article of manufacture, comprising the cement resulting from the treatment of commercial partially calcined dolomite containing a minor proportion of lime, and containing finely divided cuprous oxide in amount from 3 to 10% by weight, with magnesium chloride solution.

4. The method of making a magnesium oxychloride cement, which consists in incorporating finely divided cuprous oxide in a partially calcined dolomite, and then treating the mass with a solution of magnesium chloride in the presence of air.

DEAN S. HUBBELL.